United States Patent
Starr

(10) Patent No.: US 6,470,059 B2
(45) Date of Patent: Oct. 22, 2002

(54) AUTOMATIC FILTER FOR ASYMMETRIC DIGITAL SUBSCRIBER LINE SYSTEM

(75) Inventor: Thomas J. J. Starr, Barrington, IL (US)

(73) Assignee: SBC Technology Resources, Inc., Austin, TX (US)

( * ) Notice: Subject to any disclaimer, the term of this patent is extended or adjusted under 35 U.S.C. 154(b) by 33 days.

(21) Appl. No.: 09/750,893

(22) Filed: Dec. 28, 2000

(65) Prior Publication Data

US 2002/0085626 A1 Jul. 4, 2002

(51) Int. Cl.[7] .......................... H04L 25/08; H03D 1/04; H03D 1/06; H03K 5/01; H04B 1/10
(52) U.S. Cl. ................. 375/350; 375/346; 375/260; 379/399.01
(58) Field of Search ............................... 375/222, 257, 375/258, 259, 260, 285, 288, 346, 350; 333/12, 17.1; 327/551, 552, 553; 379/416, 399.01; 455/63, 296

(56) References Cited

U.S. PATENT DOCUMENTS

| | | |
|---|---|---|
| 5,249,224 A | 9/1993 | Chambers |
| 5,258,713 A | 11/1993 | Rosch et al. |
| 5,848,150 A | 12/1998 | Bingel |
| 5,930,310 A * | 7/1999 | Freeman ..................... 375/346 |
| 5,974,139 A | 10/1999 | McNamara et al. |
| 5,987,069 A | 11/1999 | Furukawa et al. |
| 5,991,269 A | 11/1999 | Williamson et al. |
| 5,995,567 A * | 11/1999 | Cioffi et al. ................. 375/346 |
| 6,014,412 A * | 1/2000 | Wiese et al. ................. 375/346 |
| 6,052,420 A | 4/2000 | Yeap et al. |
| 6,055,297 A | 4/2000 | Terry |
| 6,058,162 A | 5/2000 | Nelson et al. |
| 6,073,179 A | 6/2000 | Liu et al. |
| 6,078,662 A * | 6/2000 | Denedios ..................... 379/416 |

* cited by examiner

Primary Examiner—Betsy L. Deppe

(57) ABSTRACT

An apparatus for filtering radio frequency interference in a signal transmitted on a twisted-pair communication channel such as an ADSL transmission line. The apparatus includes a filter adapted to be selectively engaged in-line with the communication channel by a switch or switches when the differential mode noise in any predetermined frequency sub-band exceeds a threshold noise level, or the sum of the sub-band noise signals exceeds a wideband threshold noise value. When the filter is not engaged, it is isolated from the communication channel by a bypass switch or pair of bypass switches.

19 Claims, 2 Drawing Sheets

AUTOMATIC FILTER FOR ASYMMETRIC DIGITAL SUBSCRIBER LINE SYSTEM

FIELD OF THE INVENTION

The present invention relates to data transmission systems and more particularly, concerns an automatic filter for an Asymmetric Digital Subscriber Line system to mitigate narrowband interference.

BACKGROUND OF THE INVENTION

Asymmetric Digital Subscriber Line ("ADSL") is a technology which allows for high-speed data communication simultaneously with voice traffic over twisted-pair phone lines. Twisted pairs, which can be used to connect a central telephone system to a subscriber's telephone system can support bandwidths up to 2 MHz through the use of digital signal processing ("DSP") technology. Full rate ADSL transmission systems based on American National Standard Institute ("ANSI") T1.413 and International Telecommunication Union ("ITU") G.992.1 operate in a frequency range from approximately 25 kHz to 1.1 MHz. Transmission rates in accordance these ADSL standards are intended to facilitate the transmission of information at rates of up to 8 million bits per second over twisted-pair phone lines.

The standardized system defines the use of a discreet multitone ("DMT") modulation method that transmits information in 256 "tones" or sub-bands that are each 4.3125 kHz wide in the forward or downstream direction. In the context of a phone system, the downstream direction is defined as transmissions from the central office to a remote location that may be an end user such as a residence or business.

The ADSL standard also defines the use of a reverse signal at a data rate in the range of 16 to 800 kilobits per second. The reverse signal corresponds to transmissions in an upstream direction, i.e. from the remote location to the central office. The term "ADSL" results from the "asymmetric" data transmission rates in the upstream and downstream direction.

In nearly all ADSL implementations, twisted-pair phone lines are used as at least a part of the transmission medium that connects the central office to end users. The twisting of the twisted-pair provides some protection against external radio frequency interference ("RFI"). However, the twisted-pair phone lines exhibit antennae-like properties at high frequencies. As a result, RFI becomes a significant contributor to noise within the transmission system, particularly as distance and frequency increases. This can become particularly problematic in very high speed DSL ("VDSL") systems.

The information capacity of each DMT sub-band depends on many factors including RFI ingress. For low amplitude RFI, approximately only 2 DMT sub-bands are affected. However, field experience with ADSL has shown that in the proximity of high power radio transmitters, RFI can affect a large number of DMT sub-bands because of the limitations of sub-band filters. In addition, in some cases, a high level of RFI can exceed the dynamic range of the analog-to-digital converter in the ADSL receiver resulting in a total failure of the ADSL system. Standard ADSL systems which operate in a frequency range from approximately 25 kHz to approximately 1.1 MHz are particularly susceptible to RFI since AM radio broadcasts which comprise of principal source of RFI, operate at frequencies above 535 kHz.

A balanced digital subscriber loop comprising a twisted wire pair carries both differential and common mode currents. The differential currents carry the information signal, and the common mode currents are typically associated with noise sources. One form of common mode noise is RFI.

Various techniques are known for reducing interference or noise in a communication channel. For example, U.S. Pat. No. 6,052,420 entitled "Adaptive Multiple Sub-Band Common-Mode RFI Suppression" discloses a technique for canceling common mode noise on a two-conductor communications channel. This technique involves a device for extracting from the channel a corresponding common mode signal and a noise estimation unit for deriving from the common mode signal a noise estimate signal representing a common mode noise level in a selected frequency band which is narrower than the operating band width of the differential signal. The noise estimation unit adjusts the amplitude of the noise estimate to correspond to the residual noise in the differential mode signal and subtracts it from the differential mode signal to produce a noise-suppressed output signal. The noise detection and control units scans the operating band to identify the frequency bands having the highest noise level and uses the noise estimation unit to suppress the noise in those bands. This technique is not entirely satisfactory because it relies upon the common mode signal to generate the noise suppression signal for the differential mode signal. Moreover, this system requires a high correlation between the common mode and differential mode noise signals, and is also highly dependent on a high quality ground connection. In practice, a high quality ground connection may be difficult to achieve and the common-to-differential mode correlation may be frequency dependent.

Accordingly, an object of the present invention is to eliminate or mitigate the disadvantages of the foregoing known technique and provide an automatic filter for suppressing narrowband noise such as RFI in an ADSL system.

BRIEF DESCRIPTION OF THE DRAWINGS

For a more complete understanding of this invention, reference should now be made to the embodiments illustrated in greater detail in the accompanying drawings and described below by way of examples of the invention.

In the drawings.

DETAILED DESCRIPTION OF THE INVENTION

Broadly speaking, the invention is a technique for removing narrowband interference such as RFI from received signals by dynamically engaging a notch filter at the frequency sub-band having detected differential mode noise. The filter is implemented using frequency domain analysis to detect differential mode interference by comparing the actual frequency sub-band power level to a predetermined frequency sub-band power level. The filter is also engaged if the total power level above a certain frequency is greater than a predetermined power level. The invention also contemplates engaging the filter upon a command from the user or the network service operator. Alternatively, the filter can be a low-pass filter with a pass-band below a predetermined frequency such as, for example, 540 kHz. The present invention is advantageous in that the front end filter is only engaged when excessive RFI is present. In such cases, the filter is engaged under the control of the ADSL transceiver unit receiver end ("ATU-R") to prevent the RFI noise from reaching the ADSL receiver.

Figure 1:
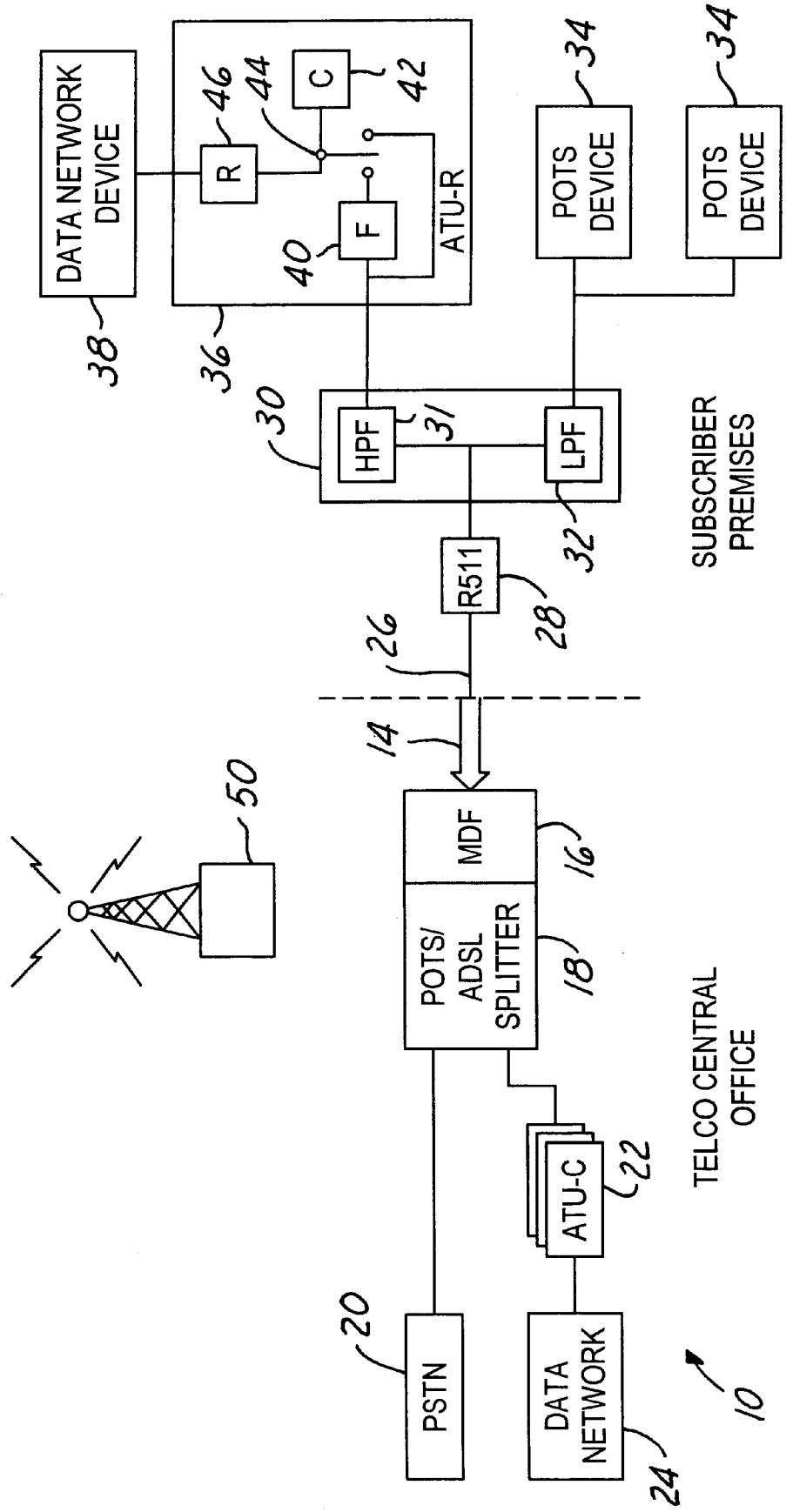
FIG. 1 is a block diagram of an ADSL system incorporating an automatic filter for RFI suppression according to one embodiment of the present invention.

Referring now to FIG. 1, there is shown a block diagram of an ADSL system incorporating an automatic filter for RFI suppression according to one embodiment of the present invention. The diagram of FIG. 1 is divided into two portions, one of which represents the telco central office 10 and the other of which represents the subscriber premises 12. Communication channel 14 represents the main feeder cables to the telco outside plant. These cables interface with the main distribution frame ("MDF") 16 within the central office 10. A splitter 18 divides the plain old telephone service ("POTS") signals from the higher frequency ADSL signals. The POTS signals are routed through the central office switch to the worldwide Public Switched Telephone Network 20. The ADSL signals are routed to a plurality of ADSL transceiver units at the central office ("ATU-C") 22 each of which corresponds to a respective ADSL transceiver unit remotely located ("ATU-R") at a subscriber premises. The ATU-Cs 22 connect through the central office ADSL subscriber loop and data network interface to access the Internet ISP and other data networks 24.

At least a portion of the communication channel that connects the central office 10 with the subscriber premises 12 comprises a twisted-pair subscriber loop 26. The frequency bands transmitted along the twisted-pair subscriber loop 26 between the central office 10 and the subscriber premises 12 include the low frequency POTS band, the higher frequency upstream data communication band and the higher frequency downstream data communication band. The twisted-pair subscriber loop 26 connects to the subscriber premises through a standard RJ11 modular connector 28. A splitter 30 comprising a high pass filter 31 and a low pass filter 32 may also be included at the subscriber premises 12 to divide the higher frequency data communication bands from the lower frequency POTS communication band. The POTS signals are then transmitted to POTS devices 34 such as a telephone or facsimile machine. The higher frequency data signals are communicated to the ATU-R 36 incorporating the dynamic filtering arrangement of the present invention to transmit data signals having minimized RFI to the subscriber's network device 38 such as a computer. Of course, in a splitter-less ADSL configuration, the splitter 30 would not be necessary and the ATU-R 36 would incorporate a device for filtering out the POTS band communication signals.

The ATU-R comprises a notch filter or a low pass filter 40, a controller 42 including noise detection circuitry which is operative to control a bypass switch 44 which connects the data communication signals to a conventional ADSL receiver 46.

Also shown in FIG. 1 is a noise source 50 operating in the vicinity of the twisted-pair subscriber loop 26. The noise source 50 produces radio signals which can interfere with the data communication signals being received by the ATU-R 36. As explained above, in the case of high speed data transmissions such as those used in ADSL and VDSL systems, radio transmissions operate in overlapping frequency ranges and thus are potential noise or interference sources.

Figure 2:
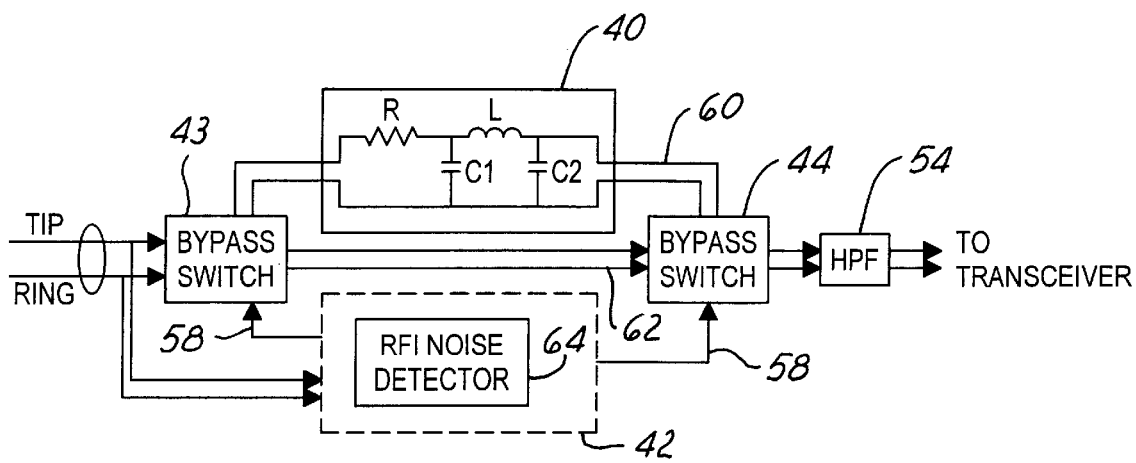
FIG. 2 is a block diagram of an automatic filter for RFI suppression and associated controller according to one embodiment of the present invention.

Referring now to FIG. 2, there is shown a block diagram of one embodiment of the filter arrangement for RFI noise suppression according to the present invention. In this example, the filter comprises a third-order passive LC Butterworth low-pass filter 40. The filter 40 is arranged between the twisted-pair data communication input represented by the "tip" and "ring" connections and the ADSL transceiver by way of two bypass switches 43, 44. The bypass switches 43, 44 are operative to connect either the unfiltered communication signals 62 or filtered communication signals 60 to the ADSL transceiver in response to a control signal 58 from the ADSL controller 42. The bypass switches 43,44 serve to remove the filter 40 from the communications channel 62 when the filter is not desired. When the filter is disconnected, both sides of the filter are preferably open-circuits to eliminate the filter's effect on the impedance presented to the line while the filter is bypassed. In contrast, the controller 42 is preferably connected to the communication channel at all times.

The controller 42 comprises an RFI noise detector 64 which is operative to detect RFI noise on the differential mode signal as described in more detail below with reference to FIG. 3. The controller 42 is preferably a microprocessor or digital signal processor and may be part of or separate from the processor controlling the high level operation of the DSL transceiver. The functioning of the controller is preferably implemented as firmware executed by the microprocessor or digital signal processor.

A high-pass filter 54 may also be included in-line with the communication channel to reject out-of-band energy such as, for example, frequencies above 1.1 MHz. This high-pass filter 54 can be implemented downstream of the filter and bypass switches as shown or upstream of the filter arrangement.

Preferably, the low pass filter shown in FIG. 2 is configured to have a pass-band below a predetermined frequency such as, for example, 540 kHz. In this way, upon the detection of radio frequency interference above a predetermined level, the controller 42 would engage the bypass switch 44 via control signal 58 to include the filter 40 in the communication path to the DSL transceiver thereby blocking data transmissions above 540 kHz which approximately corresponds to the low end of the AM radio broadcast frequency spectrum. Alternatively, the filter 40 can be a notch filter configured to block communication signals occurring in a predetermined frequency band such as, for example, 600 kHz to 800 kHz which corresponds to approximately the lower half of the AM radio frequency broadcast spectrum. Engaging the filter 40 in the communication path to the DSL transceiver, however, eliminates part of the ADSL bandwidth thereby restricting the maximum achievable data rate to an amount less than would be possible when operating without the filter engaged and without high levels of RFI. To this end, the filter 40 would preferably only be engaged under one of the following conditions: the detection of power levels in a narrow band which exceed a predetermined power level; detection of excessive RFI above a certain predetermined frequency; an input overload detection; upon a failure of the ADSL line to start up; upon an override command from the user; or upon a command from the network service provider. A start-up failure is indicated if the modem does not detect satisfactory received signals within a predetermined time after application of input power. In such cases, the filter would be engaged, and the modem would attempt start-up again.

Figure 3:
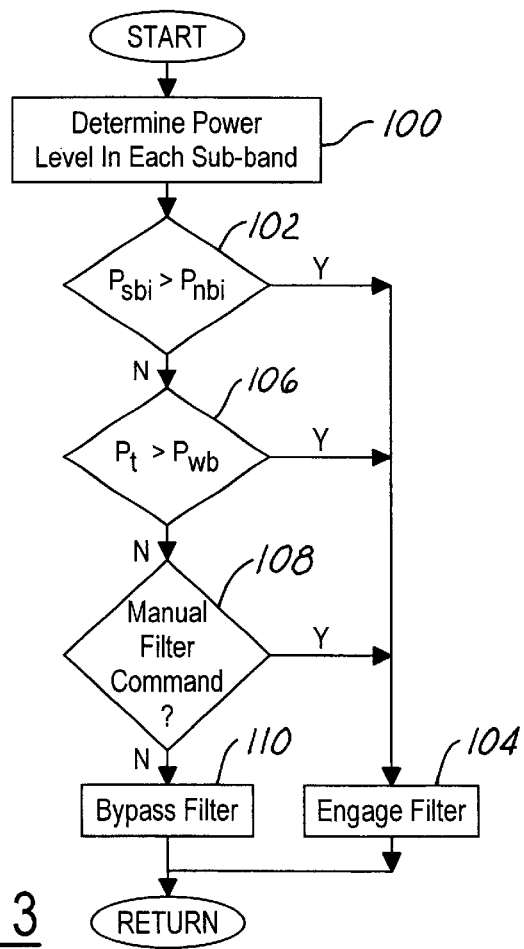
FIG. 3 is a logic flow diagram of one method of implementing the filter of FIG. 2 in an ADSL system.

Referring now to FIG. 3, there is shown a logic flow diagram of one method of implementing the filter control scheme of FIG. 2 in an ADSL system. The logic begins in step 100 by determining the received power level in each communication sub-band. The received power level in each communication sub-band is measured by applying the differential mode line signal to the ADSL receiver. The Discrete Fourier Transform outputs for each sub-band are then power equalized across the entire frequency band based upon an estimated channel response. Preferably, this is accomplished by using a Discrete Fast Fourier Transform technique. In addition, the measured power level in each communication sub-band can be integrated to reject false results due to impulse noise. The integration time constant can be 5 ms, for example, to reject impulse noise.

In addition, it preferable to perform the sub-band power measurements during a "quiet period" of ADSL transmission. This period, also known as the "C-quiet" period for ADSL transmissions, correspond to a break in the digital communication signal when no data is being received. At this time, the differential mode signal would ideally be zero. Thus, any measured power level above a predetermined minimum narrow band power level ($P_{nbi}$) as shown in step 102 is classified as interference and compared to an acceptable threshold.

In the event that the measured power in any sub-band ($P_{sbi}$, wherein i represents the number of discrete sub-bands to be tested) exceeds the narrow band power threshold ($P_{nbi}$), the controller activates the bypass switch to engage the filter as shown in step 104 to prevent the signals in the predetermined frequency range from being transmitted to the ADSL transceiver.

If none of the sub-band power levels exceed the corresponding respective narrow band power level ($P_{nbi}$) and, thus, do not indicate undesirable levels of RFI noise, the logic continues to step 106 wherein the total power ($P_t$) is compared to a wide band power threshold ($P_{wb}$). The wideband power is computed as the summation of the equalized sub-band powers within the desired range, such as 25 kHz to 1 MHz band. If the threshold of the wide band power level is exceeded, the RFI noise detector deems the entire transmission spectrum to be excessively noisy and therefore engages the filter as shown in step 104.

The controller can also engage the filter to improve transmission quality if a manual filter command is received at any time as shown in step 108. Such a filter command can originate either from the user or from the network service provider. If the detected noise level does not exceed the threshold noise level amount in any DMT sub-band, and excessive noise is not detected across the wide band signal above a predetermined frequency, and no override commands for engaging the filter are received, then the bypass switch is activated to bypass the filter and allow the full spectrum ADSL transmission signal to be delivered to the ADSL transceiver as shown in step 110. The logic routine then continues to monitor the RFI noise level in the communication channel.

From the foregoing, it can be seen that there has been brought to the art a new and improved RFI noise filter method and system for ADSL and VDSL communication systems. As compared to common-mode dependent systems discussed above, the present invention achieves greater rejection of noise, is less sensitive to variance of the common-mode noise, and does not depend upon a high quality ground connection. Also, unlike an adaptive-programmable filter that is always in the transmission path, the present invention presents no impairments to the transmission channel when little or no RFI is present. While the invention has been described in connection with one or more embodiments, it should be understood that the invention is not limited to those embodiments. For example, the RFI noise detector, filter and bypass switch can be implemented at the ATU-R or alternatively, or additionally, at the corresponding respective ATU-C. The invention may be applied to all types of DSL modem systems. Moreover, for VDSL transmission systems, the filter may comprise a high pass filter rather than a low pass filter due to the operating frequencies associated with VDSL transmissions. In this regard, the invention covers all alternatives, modifications, and equivalence, as may be included within the spirit and scope of the appended claims.

What is claimed is:

1. An apparatus for filtering radio frequency interference in a signal transmitted on a twisted-pair communication channel comprising:
   a filter adapted to be selectively engaged in-line with said communication channel;
   a first switch for selectively engaging said filter in-line with said communication channel in response to a bypass signal; and
   a controller operative to receive from said twisted-pair communication channel a differential mode signal, generate a noise signal representative of differential mode noise in a predetermined frequency band and output said bypass signal as a function of said noise signal.

2. The apparatus of claim 1 further comprising a second switch for selectively engaging said filter in-line with said twisted-pair communication channel in response to the bypass signal, said first switch located upstream of said filter and said second switch located downstream of said filter such that when said filter is bypassed, said filter is completely isolated from said twisted-pair communication channel.

3. The apparatus of claim 2 further comprising a second filter in-line with said twisted-pair communication channel, said second filter configured to block signal frequencies above approximately 1.1 MHz.

4. The apparatus of claim 1 wherein said controller is operative to determine a sub-band power value in each of a predetermined frequency sub-band of said differential mode signal and output said bypass signal as a function of a difference between said sub-band power value and a threshold power value for each frequency sub-band.

5. The apparatus of claim 4 wherein said controller is further operative to determine a wide-band power value as a function of each of said sub-band power values and output said bypass signal as a function of a difference between said wide-band power value and a threshold wide-band power value.

6. The apparatus of claim 1 wherein the filter is a third-order passive LC Butterworth low-pass filter.

7. The apparatus of claim 1 wherein the filter is configured to block signal frequencies above approximately 540 kHz.

8. The apparatus of claim 1 wherein the filter is configured to block signal frequencies between approximately 600 kHz and 800 kHz.

9. In a DSL system, a method for filtering radio frequency interference on said twisted-pair communication channel comprising:
   receiving a differential mode signal from said communication channel;
   generating a noise signal representative of differential mode noise in a predetermined frequency band; and
   selectively engaging a filter as a function of said noise signal to block a selected band of transmission frequencies from between approximately 530 kHz and 1.1 MHz.

10. The method of claim 9 wherein the step of generating a noise signal includes the step of determining a sub-band power value in each of a predetermined frequency sub-band of said differential mode signal, and the step of selectively engaging a filter includes engaging said filter as a function of a difference between said sub-band power value and a threshold power value for each frequency sub-band.

11. The method of claim 10 wherein the step of generating a noise signal includes the step of determining a wide-band power value as a function of each of said sub-band power values, and the step of selectively engaging a filter includes engaging said filter as a function of a difference between said wide-band power value and a threshold wide-band power value.

12. The method of claim 10 wherein the step of determining a sub-band power value in each of a predetermined frequency sub-band of said differential mode signal includes applying a Discrete Fourier Transform to each predetermined frequency sub-band of said differential mode signal.

13. The method of claim 10 wherein the step of generating a noise signal includes integrating each sub-band power value to reject impulse noise signals.

14. The method of claim 9 wherein the step of selectively engaging a filter includes the step of transmitting a control signal to a bypass switch wherein the bypass switch is adapted to engage said filter in-line with said twisted-pair communication channel in response to said control signal and, otherwise, isolate said filter from said communication channel.

15. A method for filtering radio frequency interference on said twisted-pair communication channel in a DSL system comprising a filter adapted to be selectively engaged in-line with said twisted-pair communication channel and a bypass switch for selectively engaging said filter in-line with said twisted-pair communication channel in response to a control signal, the method comprising:
    receiving a differential mode signal from said communication channel;
    determining a sub-band power value in each of a predetermined frequency sub-band of said differential mode signal;
    comparing each of said sub-band power values with a respective threshold power value for each frequency sub-band; and
    generating said control signal when any sub-band power value exceeds the corresponding said respective threshold power value.

16. The method of claim 15 further comprising the steps of:
    determining a wide-band power value as a summation of each of said sub-band power values;
    comparing said wide-band power value with a threshold wide-band power value; and
    generating said control signal when said wide-band power value exceeds said threshold wide-band power value.

17. The method of claim 15 wherein the step of determining a sub-band power value in each of a predetermined frequency sub-band of said differential mode signal includes applying a Discrete Fourier Transform to each predetermined frequency sub-band of said differential mode signal.

18. The method of claim 15 wherein each frequency sub-band is approximately 4.3125 kHz wide and is between a frequency range of 530 kHz and 1.1 MHz.

19. The method of claim 15 wherein the filter is a third-order passive LC Butterworth low-pass filter.

* * * * *